3,093,472
METHOD FOR COMBATING HARD GRASS AND NEMATODES
Bernhard Homeyer, Opladen, and Engelbert Kühle, Cologne-Stammheim, Germany, assignors to Farbenfabriken Bayer Aktiengesellschaft, Leverkusen, Germany, a corporation of Germany
No Drawing. Filed Feb. 19, 1960, Ser. No. 9,679
2 Claims. (Cl. 71—2.7)

The present invention relates to and has as its objects new and useful nematicidal compositions and a method of conditioning and improving the quality of soil therewith. The active ingredient which is used according to the present invention for this purpose is the unsymmetrical heptachloro-propane or hexachloropropene.

1.3-dichloro-propene as such or in mixture with 1.2-dichloropropane is known to exhibit an excellent nematicidal action. Some disadvantages of these compounds, however, are their skin irritation and the high volatility, the latter causing a diminished period of activity. Therefore by using these compounds treatment has to be repeated after some time. In various cultures besides the aforementioned disadvantages also plant damages have been observed and in some instances also a phytotoxic action occurred.

In accordance with this invention it has been found that the unsymmetrical heptachloro-propane or hexachloropropene have an outstanding nematicidal action without showing the above mentioned disadvantages. Thus, these compounds are well tolerated by culture plants and exhibit a long period of action when applied to the soil. The preparation of the above mentioned compounds is known from Rec. 54, 249 (1935), or Org. Synth. II, page 312 (1955), and is carried out by reaction of chloroform and perchloro-ethylene in the presence of aluminium chloride catalysts.

When used for combating nematodes or for disinfecting soil these compounds may be used as such, but sometimes it is more advantageous to use solutions of these compounds, e.g. in mineral oils or carbon tetrachloride. In some cases also aqueous emulsions may be used advantageously. Those emulsions may be prepared by adding to unsymmetrical heptachloropropane or hexachloropropene a certain amount of an emulsifier especially commercially available emulsifier on non-ionic basis, e.g. nonyl-phenol polyglycol ethers or the like. These aqueous emulsions may be used in active dilutions as sprays.

If used as such the compounds may be injected into the soil by known soil injections. If incorporated into solid materials such as chalk, talc, bentonite, kieselguhr or the like, such mixtures may also be applied on the surface of the soil and then incorporated into the soil by known methods, e.g. by harrowing and ground milling. Also if used as such the compounds may be applied on the surface of the soil and later on incorporated by the same methods. At last the unsymmetrical heptachloropropane or hexachloro-propene also may be used in combination with other known herbicides, fungicides, insecticides, fertilizers and the like.

In addition to the nematicidal action unsymmetrical heptachloro-propane or hexachloro-propene most surprisingly have a herbicidal action against some mono-cotyledons especially against some hard grass which could not be destroyed as yet efficiently by known herbicidal agents. This fact is most surprising, since culture plants are not damaged by the unsymmetrical heptachloro-propane or hexachloro-propene.

The following examples may illustrate the activity of the unsymmetrical heptachloro-propane or hexachloropropene:

EXAMPLE 1

Soil heavily infested with *Meloidogyne incognita* and *Heterodera rostochiensis* respectively is placed in flower pots of about quart size content. The soil is mixed with unsymmetrical heptachloro-propane as such in an amount shown in the table below. The pots are placed covered at a temperature of 24° C. and after a security period of 1 week they are planted with tomatoes or potatoes. After a growing period of 4 weeks the roots of the plants are checked for gall- and cyst-formulation. The amounts of commercially used dichloro-propene mixtures are determined in comparison to unsymmetrical hepta-chloro-propane. Also from these compounds the pure mixture had been taken and had been administered by mixing thoroughly the soil with the quantities given in the table below.

The quantity is given in p.p.m., the activity is determined in a percentage scale, whereby 100 means complete killing of gall- and cyst-content, and 0 means no activity at all.

(1) *Activity of heptachloro-propane with* Meloidogyne incognita *on tomato plants*

| Quantity used in p.p.m. | Unsymmetrical heptachloropropane | Dichloropropene/dichloropropane |
| --- | --- | --- |
| 50 | 100 | 100 |
| 40 | 100 | 100 |
| 30 | 100 | 90 |
| 20 | 100 | 50 |
| 10 | 50 | 0 |

(2) *Activity of heptachloro-propane with* Heterodera rostochiensis *on potato plants*

| Quantity used in p.p.m. | Unsymmetrical heptachloropropane | Dichloropropene/dichloropropane |
| --- | --- | --- |
| 50 | 100 | 100 |
| 40 | 100 | 95 |
| 30 | 100 | 80 |
| 20 | 50 | 0 |
| 10 | 0 | 0 |

EXAMPLE 2

Unsymmetrical heptachloro-propane is incorporated into the soil in the amount shown in the table below (g./m.$^2$). For incorporation there has been used a 2 to 5% aqueous emulsion. This emulsion has been prepared by using twice the amount by weight (referred to active ingredient) of acetone as auxiliary solvent and with the same amount by weight of a commercial emulsifier consisting of a nonylphenol polyglycol ether (NP10).

From the following table it is to be seen: the growing of weed (hard grass) 2 weeks after treatment of the soil from column 1; from columns 2, 3 and 4 the growing in percent of culture plants which have been sown into the soil 4 days after treatment. Evaluation occurred 2 weeks after treatment; from columns 5 and 6 the same percentage ciphers are to be seen from seed which has been sown into the soil 2 weeks after treatment with unsymmetrical heptachloro-propane. The evaluation numbers in column 1 mean 0=complete destruction of hard grass and difficult to combat weeds of this type, and 5=no combating effect at all. The intermediate ciphers mean activities between those extremes. For comparison the same experiment has been carried out with a dichloropropene-dichloropropane-mixture and the results are also to be seen from the table below.

| Compounds | Quantity in g./m.² | Weed—evaluation after 2 weeks | Culture plants—1st sowing after 4 days. Percent germination after 10 days | | | Culture plants—2nd sowing after 2 weeks. Percent germination after 10 days | |
|---|---|---|---|---|---|---|---|
| | | | Carrots | Beans | Maize | Carrots | Beans |
| Heptachloropropane | 200 | 0.0 | 0 | 0 | 0 | 0 | 0 |
| | 100 | 0.0 | .2 | 0 | 0 | 14 | 0 |
| | 50 | 0.0 | 38 | 10 | 16 | 84 | 54 |
| | 0 | 5.0 | 68 | 20 | 62 | 86 | 78 |
| Dichloropropene/dichloropropane-mixture. | 80 | 2.0 | 79 | 21 | 52 | | |
| | 40 | 3.0 | 83 | 46 | 73 | | |
| | 20 | 4.5 | 81 | 57 | 76 | | |
| | 0 | 5.5 | 85 | 51 | 73 | | |

We claim:
1. A method of combating nematodes which comprises treating nematode-infested soil with an effective amount of a member selected from the group consisting of unsymmetrical heptachloro-propane and hexachloropropene.
2. A method for combating hard grass which comprises treating soil with an effective amount of at least one member selected from the group consisting of unsymmetrical heptachloropropane and hexachloropropene.

References Cited in the file of this patent
UNITED STATES PATENTS

| 2,110,842 | Ressler | Mar. 8, 1938 |
| 2,415,251 | Leavitt | Feb. 4, 1947 |
| 2,785,984 | Kenaga | Mar. 19, 1957 |